June 17, 1930.  E. R. STANDFUSS  1,764,905

STUMP PULLER

Filed April 5, 1928

INVENTOR.
ERNEST R. STANDFUSS
BY
Bottum, Hudnall, Lecher, McNamara and Michael
ATTORNEYS.

Patented June 17, 1930

1,764,905

UNITED STATES PATENT OFFICE

ERNEST R. STANDFUSS, OF MILWAUKEE, WISCONSIN, ASSIGNOR TO HARNISCHFEGER CORPORATION, OF MILWAUKEE, WISCONSIN, A CORPORATION OF WISCONSIN

STUMP PULLER

Application filed April 5, 1928. Serial No. 267,540.

This invention relates to a stump puller and has for its object the provision of a machine or power actuated stump puller which greatly speeds up and facilitates clearing operations in connection with the construction of highways or in connection with various engineering, agricultural, or other developments.

Another important object of the invention resides in the provision of a stump puller of this character which is so constructed and so organized with the power means or machine controlling its operation that a single operator on the machine may so control the machine as to move the stump puller into operative position around the stump, engage it with the stump, next pull the stump out of the ground, then shift or swing the stump to the desired point of deposit and finally release the stump and deposit it in the desired position. Only one operator is necessary and he can readily and easily control and carry out the various operations without leaving the machine.

Another object resides in the provision of a stump puller which has very effective means for gripping and holding the stump under the control and actuation of the machine.

In carrying out the present invention, a novel stump puller is provided and is organized with an excavating machine of the type used with the drag line bucket. This type of excavating machine comprises a revolving platform mounted on a truck of the endless traction belt type or on other suitable running gear, a boom supported on the platform and power driven drums on the platform which control a hoist line extending out over the boom and a drag line extending out under the boom. The stump puller organized with this machine comprises a frame member having a pair of flexible grippers each gripper being made up of a plurality of links or sections pivotally connected to each other and pivotally mounted on the frame for movement in a horizontal plane. The outer ends of these grippers have flexible means connecting them with the drag line. For spreading the grippers flexible elements or cables connected to the hoist lines are reeved through a pulley arrangement provided on the frame and are connected to the outer ends of the grippers so that when the hoist line is tensioned it operates to spread the grippers. On the other hand when the hoist line is slackened and the drag line is tensioned or hauled in, then the grippers are pulled around into firm engagement with the stump to permit the full pull of the machine to be exerted upon the stump to uproot the same. Due to the flexible character of the grippers, they firmly clamp and hold the stump between them and there is no tendency on the part of the grippers to push or cam the stump outwardly from between them. After the stump is uprooted, it may be elevated above the ground under the joint action of the hoist line and drag lines, or it may be dragged across the ground to the selected place of deposit. The links making up the grippers are preferably provided with toothed faces presented to engage the stump. Moreover these links have interfitted portions and are pivoted about a vertical axis so that they may swing horizontally, but are constrained against any relative vertical movement. This construction facilitates the placing of the stump puller in operative relation to the stump under the control of the machine.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1:
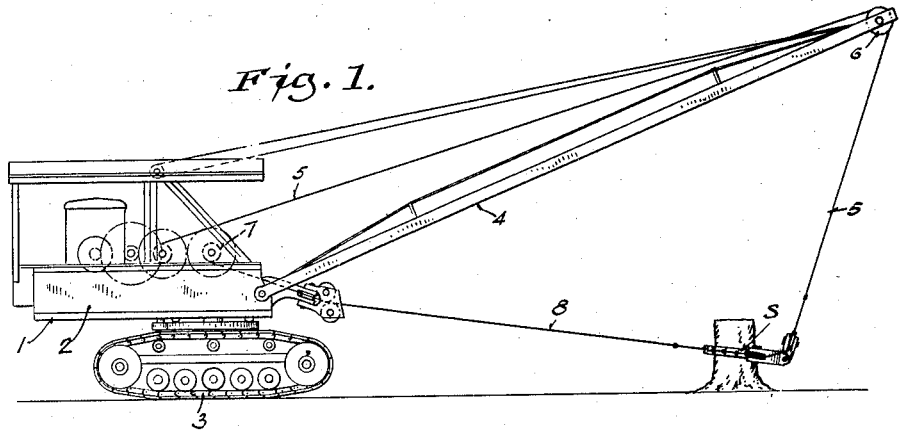
Figure 1 is a view in side elevation.

Referring to the drawings, the numeral 1 designates generally an excavating machine of the type employed with the present invention. This machine which is well known and widely used in connection with drag line buckets and other instrumentalities includes a revolving platform 2 mounted on a truck 3 of the endless traction belt type. A boom 4 is suitably supported on the revolving platform 2. A hoist line 5 extends out over a pulley 6 provided at the outer and upper end of the boom and then down to the stump puller designated generally at S and embodying the present invention. The hoist line 5 is controlled by one of the power driven drums 7 mounted on the revolving platform. A similarly controlled drag line 8 is provided and extends out under the boom 4 to the stump puller S with which it is connected as will be hereinafter more fully described.

The stump puller S comprises a curved and rigid frame member 10 on which a pair of flexible grippers designated generally at 11 and 12 are mounted. The grippers are of identical construction so that a single description will serve for both. Each gripper is made up of a plurality of arcuate or curved links 13 of identical construction and a similar outer end link 14. Each link 13 is formed with a recess 15 at one end and a projecting tongue 16 at its opposite end adapted to fit in a correspondingly formed recess 15 in an adjacent link. Pivot pins 17 co-act with the interfitted tongues and recesses to constrain the links 13 to pivotal movement in a horizontal plane. The link 14 is similarly connected to the associated link 13, this link 14 being formed with a recess 15′ similar to recesses 15 and receiving the tongue 16 of the adjacent link 13, a pin 17′ pivotally connecting the link 14 to the adjacent link 13. The inner end link 13 of each gripper has its recessed inner end portion fitted in a slot 18 provided in the frame 10 and is pivotally connected to the frame by means of a pivot pin 19. The inner end links of the grippers have their pivotal connections to the frame located adjacent the center of the frame and closely adjacent each other and in fact are only separated to such extent as is necessary to leave operating clearance between the inner end links of the grippers. The inner face of each link of the grippers is provided with teeth or serrations 20 designed to enhance the gripping engagement with the stump. The forward end links 14 are connected at their outer ends as at 21 with the bail or flexible connections 22 provided between these links 14 and the drag line 8. These links 14 also have apertured lugs 23 integrally formed with the outer side portions thereof and connected to the ends of flexible connections or lines 24 which are trained around the outside of pulleys 25 rotatably mounted on the ends of frame member 10 and in and around the insides of pulleys 26 rotatably mounted on a swingable bracket 27. The bracket 27 has an integral apertured lug 28 fitted in between a pair of apertured lugs 29 integral with the frame 10, a pivot pin 30 serving to pivotally connect the lugs 28 and 29 and consequently to provide a swingable mounting for the bracket of the frame 10. The ends of the flexible connections 24 opposite the points of fastening of these connections with the links 14 are connected or fastened to the hoist line 5.

Figure 2:
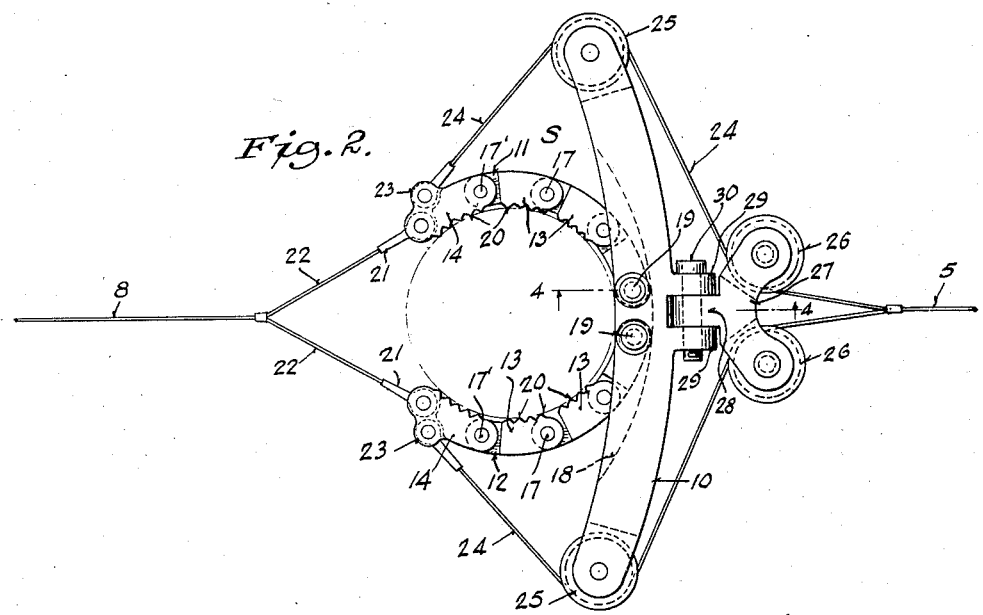
Figure 2 is a plan view of the stump puller and the portions of the hoist and drag lines that connect therewith.
Figure 3:
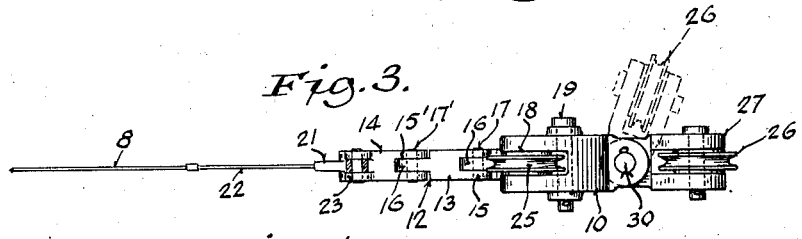
Figure 3 is a view partly in side elevation and partly in vertical section of the parts shown in Figure 2.
Figure 4:
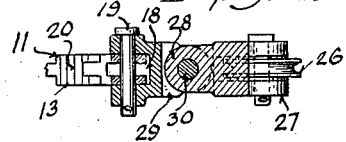
Figure 4 is a detail sectional view taken on line 4—4 of Figure 2.

In use, the operator of the machine by a tensioning on the hoist line 5 is able to raise the stump puller S and expand its grippers 11 and 12, the grippers 11 and 12 being pulled back toward the frame and away from each other. With the stump pullers so positioned the operator may throw it around a stump under the control of the hoist and drag lines and then by tensioning the drag line 8 and appropriately slackening the hoist line, the grippers may be pulled around into engagement with the stump as shown in Figure 2. The grippers, due to their link or flexible construction clamp and confine the stump between them and do not tend to cam the stump out through their open ends. As the drag line is hauled in the stump being firmly gripped, is pulled out of the ground. Then, by maintaining tension on the drag line and tensioning the hoist line the stump may be elevated and swung to one side under the influence of the boom to the place of deposit. The stump is automatically released by slackening on the drag line and pulling on the hoist line.

I claim:

1. An apparatus for pulling stumps including a frame, a pair of grippers connected to the frame, a drag line connected to the grippers and adapted to contract the grippers when tensioned and a hoist line associated with the frame and with the grippers and adapted to spread the grippers when tensioned.

2. An apparatus for pulling stumps including a frame, a pair of flexible grippers connected to the frame and a drag line connected to the grippers and adapted to contract the grippers when tensioned.

3. An apparatus for pulling stumps including a frame, a pair of flexible grippers made up of links and means for interconnecting the links to constrain them to pivotal movement in a horizontal plane, a drag line connected to the grippers and adapted to contract the grippers when tensioned and a hoist line associated with the frame and with the grippers and adapted to spread the grippers when tensioned and to shift the frame and grippers bodily.

4. A stump puller including a frame and a pair of grippers, each gripper being pivotally connected to the frame and being made up of a plurality of pivotally connected links.

5. A stump puller including a pair of flexible grippers, each gripper being made up of a plurality of links and means for constraining the links to pivotal movement in approximately one plane.

6. A stump puller including a pair of grippers, each gripper being pivotally connected to the frame and being made up of a plurality of pivotally connected links, said links having serrated faces engageable with the stump.

7. A stump puller including a pair of grippers, each gripper being pivotally connected to the frame and being made up of a plurality of pivotally connected links, said links curving to conform to the general contour of a stump.

8. An apparatus for pulling stumps including a frame, grippers pivoted to intermediate portions of the frame, a hoist line, flexible connections between the hoist line and the grippers and guide means on the frame for the flexible connections whereby when the hoist line is tensioned the flexible connections tend to spread the grippers and a drag line connected with the grippers and adapted to contract the same when tensioned.

9. An apparatus for pulling stumps including a frame, grippers pivoted to intermediate portions of the frame, a hoist line, flexible connections between the hoist line and the grippers and guide means on the frame for the flexible connections, including pulleys at the outer ends of the frame around which the flexible elements are trained, whereby when the hoist line is tensioned the flexible connections tend to spread the grippers and a drag line connected with the grippers and adapted to contract the same when tensioned.

10. An apparatus for pulling stumps including a frame, grippers pivoted to intermediate portions of the frame, a hoist line, flexible connections between the hoist line and the grippers and guide means on the frame for the flexible connections including pulleys at the outer ends of the frame and a swingable bracket rearwardly of the frame and carrying pulleys, the flexible elements being trained around the pulleys, whereby when the hoist line is tensioned the flexible connections tend to spread the grippers and a drag line connected with the grippers and adapted to contract the same when tensioned.

11. An apparatus for pulling stumps including flexible gripping means and a drag line connected therewith to contract the flexible gripping means into gripping engagement with a stump.

12. An apparatus for pulling stumps including flexible gripping means, a drag line connected therewith to contract the flexible gripping means into gripping engagement with a stump, and hoist line controlled means for spreading the flexible gripping means and for bodily shifting the same.

13. A stump puller comprising a pair of grippers flexible in one plane only.

14. An apparatus for pulling stumps comprising a frame, a pair of flexible grippers, each gripper being made up of a plurality of links pivotally connected for movement in the plane of the frame, the inner ends of the grippers being pivotally connected to the frame at adjacent points, a drag line connected to the outer ends of the gripper and adapted to contract the grippers when tensioned, a hoist line, and flexible connections connected to the hoist line and guided around the frame and connected to the grippers for spreading the grippers when the hoist line is tensioned.

15. An apparatus for pulling stumps comprising a frame, a pair of flexible grippers, each gripper being made up of a plurality of curved links having interfitted and pivotally connected tongues and recesses, the inner ends of the grippers being pivotally connected to the frame at adjacent points, a drag line connected to the outer ends of the gripper and adapted to contract the grippers when tensioned, a hoist line, and flexible connections connected to the hoist line and guided around the frame and connected to the grippers for spreading the grippers when the hoist line is tensioned.

16. An apparatus for pulling stumps comprising a frame, a pair of grippers carried by the frame, a drag line connected with the grippers for contracting the same, pulleys at the ends of the frame, pulleys carried by an intermediate portion of the frame, a hoist line, and flexible connections connected with the hoist line, trained around said pulleys and connected to the grippers.

17. An apparatus for pulling stumps including a pair of flexible grippers made up of links constrained to flexing movement in approximately one plane, a drag line connected to the grippers and adapted to move the grippers toward each other and into gripping engagement with the stump when the drag line is tensioned and a hoist line associated with the grippers for spreading and bodily moving the same.

In witness whereof, I hereto affix my signature.

ERNEST R. STANDFUSS.